(12) United States Patent
Marchant et al.

(10) Patent No.: US 6,433,061 B1
(45) Date of Patent: Aug. 13, 2002

(54) RHEOLOGY MODIFYING COPOLYMER COMPOSITION

(75) Inventors: Nancy Marchant, Medina; Simon Yu, Westlake, both of OH (US)

(73) Assignee: Noveon IP Holdings Corp., Cleveland, OH (US)

( * ) Notice: Subject to any disclaimer, the term of this patent is extended or adjusted under 35 U.S.C. 154(b) by 0 days.

(21) Appl. No.: 09/694,917

(22) Filed: Oct. 24, 2000

(Under 37 CFR 1.47)

(51) Int. Cl.[7] .............................. C08F 20/06; C08F 20/16
(52) U.S. Cl. .................. 524/460; 524/529; 524/533; 524/555; 524/556; 524/558; 524/559; 524/560
(58) Field of Search ................................ 524/460, 522, 524/533, 555, 556, 558, 559, 560

(56) References Cited

U.S. PATENT DOCUMENTS

| | | |
|---|---|---|
| 2,798,053 A | 7/1957 | Brown |
| 3,915,921 A | 10/1975 | Schlatzer, Jr. |
| 3,940,351 A | 2/1976 | Schlatzer, Jr. |
| 4,062,817 A | 12/1977 | Westerman |
| 4,066,583 A | 1/1978 | Spaulding |
| 4,267,103 A | 5/1981 | Cohen |
| 4,384,096 A | 5/1983 | Sonnabend |
| 4,429,097 A | 1/1984 | Chang et al. |
| 5,292,843 A | 3/1994 | Jenkins et al. |
| 5,349,030 A | 9/1994 | Long, II et al. |
| 5,373,044 A | 12/1994 | Adams et al. |
| 5,739,196 A * | 4/1998 | Jenkins et al. ............... 524/549 |
| 5,739,378 A | 4/1998 | Jenkins et al. |
| 5,945,457 A | 8/1999 | Plate et al. |
| 6,004,583 A | 12/1999 | Plate et al. |

* cited by examiner

*Primary Examiner*—James J. Seidleck
*Assistant Examiner*—Olga Asinovsky
(74) *Attorney, Agent, or Firm*—Thoburn T. Dunlap; Hudak & Shunk Co., L.P.A.; Brian M. Kolkowski

(57) ABSTRACT

A rheology modifying copolymer composition containing a cross-linked copolymer of unsaturated carboxylic acid, a hydrophobic monomer, a hydrophobic chain transfer agent, a cross linking agent, and, optionally, a steric stabilizer, provides increased viscosity in aqueous electrolyte-containing environments.

61 Claims, No Drawings

RHEOLOGY MODIFYING COPOLYMER COMPOSITION

BACKGROUND OF THE INVENTION

1. Field of the Invention

The invention is directed to a rheology-modifying copolymer composition utilizing a hydrophobic chain transfer agent which provides increased viscosity in electrolyte-containing environments.

2. Description of the Prior Art

Polymeric rheology modifiers provide various rheological properties to aqueous systems, including thickening and viscosity. For example, various such aqueous compositions may provide improved stability, pigment suspension and application properties. Various rheological modified compositions for cosmetics and personal care items provide smoothness and silkiness, while in pharmaceutical applications, the compositions can provide suspension of insoluble materials or controlled release of pharmaceutical actives, or bioadhesive properties.

Carboxyl-containing polymers of vinyl or vinylidene monomers containing at least one terminal $CH_2=C<$ for use as rheology modifiers are well-known. Such polymers can be homopolymers of unsaturated polymerizable carboxylic acids, such as acrylic acid, methacrylic acid, maleic acid, maleic anhydride, itaconic acid, and the like. The polymers may also be copolymers of the aforesaid acids or anhydride monomers with (meth)acrylate esters, (meth)acrylamides, olefins, maleic anhydrides, vinyl esters, vinyl ethers, and styrenics, or copolymers with other vinyl or vinylidene monomers. Copolymers of these acids are often crosslinked with small amounts of crosslinking agents. Such polymers have been disclosed in U.S. Pat. Nos. 2,798,053, 3,915,921, 3,940,351, 4,062,817, 4,066,583, 4,267,103, 5,349,030, and 5,373,044.

These rheology-modifying polymers, however, are frequently pH dependent, are hydrolytically unstable, require their use in large amounts to effectively increase viscosity, or are sensitive to ionic components of the formulation. Additionally, these polymers are efficient only in aqueous systems having no electrolyte, such as sodium chloride.

Naturally occurring substances are also known for use as rheology modifiers in aqueous systems. Natural rheology modifiers include casein, alginates, gum tragacanth, and modified cellulose, including methyl cellulose, hydroxyethyl cellulose, hydroxypropyl cellulose and carbomethoxy cellulose. These products, however, vary in their thickening efficiency, generally provide poor flow and leveling properties, and are subject to microbial attack, thereby requiring the presence of antimicrobial agents.

The use of "associative" thickeners as rheology modifiers in aqueous systems is also known in the art. An associative thickener refers to a water-soluble or water-swellable polymer having chemically attached groups capable of hydrophobic associations similar to those of conventional surfactants. These hydrophobic associations promote water insolubility and include such chemical groups as alkyl and aralkyl groups containing from about 4 to about 30 carbon atoms, or complex hydrophobic comonomers. Such associative thickeners have been disclosed in U.S. Pat. No. 4,384,096 which describes associative polymers made via emulsion polymerization known as Hydrophobically-Modified Alkali-Soluble Emulsion Polymers (HASE). These polymers include both complex hydrophobes and conventional hydrophobes. However, while small amounts (0.01 to 5% by weight of monomer) of mercaptan-containing chain transfer agents have been disclosed for use in the polymerization of the HASE polymers, their use is not recommended as the mercaptan-containing chain transfer agent reduces the molecular weight of the polymer and, therefore, the polymer's thickening efficiency.

SUMMARY OF THE INVENTION

There has now been found a rheology-modifying copolymer composition desirably formed by dispersion or precipitation polymerization which, when introduced into an aqueous electrolyte-containing environment, will increase the viscosity of the solution. The polymeric rheology modifier is generally derived from one or more carboxylic acid monomers and hydrophobic monomers, with the incorporation of a hydrophobic mercaptan, a thioester or amino acid containing chain transfer agent into the copolymer composition, and a crosslinking agent. Optionally, a steric stabilizer can be included in the copolymer composition of the present invention.

DESCRIPTION OF THE PREFERRED EMBODIMENTS

A monomeric component of the present invention utilized to form the polymeric rheology modifier is one or more monounsaturated carboxylic acid monomers having a total of from about 3 to about 12 carbon atoms. The monomer can be monocarboxylic or polycarboxylic. More specifically, the carboxylic monomers are the olefinically-unsaturated carboxylic acids containing at least one activated carbon-to-carbon olefinic double bond, and at least one carboxyl group; that is, an acid or function readily converted to an acid containing an olefinic double bond either in the alpha-beta position with respect to a carboxyl group, $C=C-COOH$; or as part of a terminal methylene grouping, $CH_2=C<$. Olefinically-unsaturated acids of this class include acrylic acids typified by acrylic acid itself, methacrylic acid, ethacrylic acid, alpha- cyano acrylic acid, beta methylacrylic acid (crotonic acid), alpha-phenyl acrylic acid, beta-acryloxy propionic acid, cinnamic acid, p-chloro cinnamic acid, 1-carboxy4-phenyl butadiene-1,3, 3-acrylamido-3-methylbutanoic acid, itaconic acid, citraconic acid, mesaconic acid, glutaconic acid, aconitic acid, maleic acid, fumaric acid, and tricarboxy ethylene. As used herein, the term "carboxylic acid" includes the polycarboxylic acids and those acid anhydrides, such as maleic anhydride, wherein the anhydride group is formed by the elimination of one molecule of water from two carboxyl groups located on the same carboxylic acid molecule. Maleic anhydride and other acid anhydrides useful herein have the general structure

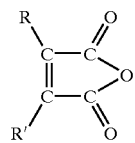

wherein R and R', independently, is hydrogen, halogen, or cyanogens, (C≡N) or a hydrocarbon having a total of from 1 to 18 carbon atoms, such as alkyl, aryl, alkaryl, aralkyl, and cycloalkyl groups such as methyl, ethyl, propyl, octyl, decyl, phenyl, tolyl, xylyl, benzyl, cyclohexyl, and the like.

The preferred carboxylic monomers are the monoolefinic acrylic acids having the general structure

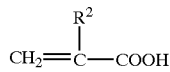

wherein $R^2$ is a substituent such as hydrogen, halogen, and the cyanogens (C≡N) groups, monovalent alkyl radicals, monovalent aryl radicals, monovalent aralkyl radicals, monovalent alkaryl radicals and the monovalent cycloaliphatic radicals having a total of from 1 to 4 carbon atoms. Of this class, acrylic and methacrylic acid are most preferred.

The amounts of such carboxylic acid monomers is generally from about 60% to 98% by weight, and preferably from about 80% to about 95% by weight based upon the total weight of the unsaturated acid monomers and the hydrophobic monomers.

Another monomeric component is a hydrophobic comonomer, these generally being esters of acids, and include the various (meth)acrylates or (meth)acrylamides of the formula:

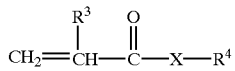

with $R^3$=H or methyl; X=O or NH; and $R^4$ containing an alkyl, an amide such as an acrylamide and the like, or an alkoxy derivative or an cyano derivative thereof, having from about 2 to about 30 carbon atoms with 6 to about 30 carbon atoms being desirable and 12 to about 30 carbon atoms being preferred. The alkyl structure can contain primary, secondary, or tertiary carbon configurations. Examples of such acrylates include methyl acrylate, ethyl acrylate, propyl acrylate, n-pentyl acrylate, n-butyl acrylate, isobutyl acrylate, 2-methyl-pentyl acrylate, n-octyl acrylate, 2-ethylhexyl acrylate, n-decyl acrylate, n-dodecyl acrylate, n-hexadecyl acrylate, n-octadecyl acrylate, behenyl acrylate, and the like; and also alkoxy derivatives thereof, such as methoxymethyl acrylate, methoxyethyl acrylate, ethoxyethyl acrylate, butoxyethyl acrylate, ethoxypropyl acrylate, and the like; and cyano derivatives thereof, such as α,β-cyanoethyl acrylate, α, β and δ-cyanopropyl acrylate, cyanobutyl acrylate, cyanohexyl acrylate, cyanooctyl acrylte, and the like; methacrylates such as steryl methacrylate, methyl methacrylate, ethyl methacrylate, octyl methacrylate, isopropyl methacrylate, 2-ethylhexyl methacrylate, n-hexyl methacrylate, octadecyl methacrylate, behenyl methacrylate, dodecyl methacrylate, hexadecylmethacrylate, and the like. Mixtures of two or three or more long chain acrylic esters may be successfully polymerized with one of the carboxylic monomers. The (meth)acrylic amides include (meth)acrylamide, N-t-butyl (meth)acrylamide, N-methyl (meth)acrylamide, N-ethyl (meth)acrylamide, octadecyl (meth)acrylamide, behenyl (meth)acrylamide, dodecyl (meth)acrylamide, hexadecyl (meth)acrylamide, and the like, where "meth" is understood to mean. Additionally, the hydrophobic monomer can be a branched hydrophobe where $R^4$ is $(CH_2)_nC(CH_3)_3$ and n=1 to 3.

The preferred hydrophobic monomers are the linear, long chain hydrophobic monomers where $R^4$ is an alkyl amide, or alkyl having at least 12 carbon atoms, such as stearyl methacrylate, hexadecyl methacrylate, and behenyl methacrylate.

Optionally, or in lieu of the hydrophobic monomers described above, a complex hydrophobe can be utilized containing polyalkyleneoxide branches capped with hydrophobic alkyl or alkylaryl groups and having the formula

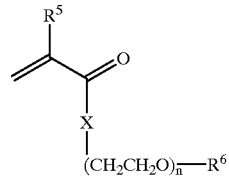

where $R^5$ is H or methyl, $R^6$ is $C_8$–$C_{24}$ alkyl, alkaryl or the residue of a polycyclic hydrocarbyl, X is O or NH and n=1 to about 750.

For a (meth)acrylic acid ester of an alkoxylated alcohol $R^6$ may typically be $C_8$–$C_{24}$ alkyl; alkylaryl, including alkylphenyl groups such as octylphenyl and nonylphenyl; or the residue of a polycyclic hydrocarbyl compound such as lanolin or cholesterol. Alkyl groups include, for example, octyl, lauryl, tridecyl, myristyl, pentadecyl, cetyl, palmityl, stearyl, eicosyl, and behenyl or docosyl. Mixtures may also be used, such as alkyl groups resulting from the alkoxylation of a mixture of lauryl, stearyl, cetyl, and palmityl alcohols. Preferably, the esters are ethoxylated derivatives. Additionally, the complex hydrophobic monomers can include ethoxylated (4) nonyl phenol (meth)acrylate, ethoxylated (23) lauryl alcohol (methacrylate), ethoxylated (40) steryl alcohol (meth)acrylate, ethoxylated (23) behenyl alcohol (meth)acrylate, behenylethoxy (25) methacrylate, ethoxylated (25) tristyriphenol (meth)acrylate, 3-phenoxy-2-hydroxypropyl methacrylate and methacrylated polystyrene.

The hydrophobic comonomer and/or the complex hydrophobic comonomer can be present in an amount from about 2 to about 40% by weight, and preferably from 5 to about 20% by weight based upon the total weight of the hydrophobic monomers and the unsaturated acid monomers.

Optionally, the polymer can contain nonionic, cationic, anionic and amphoteric or zwitterionic monomers. Examples of nonionic monomers include various hydroxy (meth)alkylacrylates where the alkyl portion has 1 to 10 carbon atoms such as hydroxyethyl(meth)acrylate; acrylamide; vinyl alcohol; vinyl esters such as vinyl acetate; n-vinylpyrrolidone, 1-hydroxypropyl methacrylate, 2-hydroxypropyl methacrylate; and the like including mixtures thereof. Illustrative cationic monomers can include ammonium, sulfonium and phosphonium salts, quarternary ammonium salts such as diallyldimethylammonium chloride, diallyldiethylammonium chloride, diethylaminoethyl methacrylate, dimethylaminoethyl methacrylate, methacryloyloxyethyltrimethylammonium sulfate, methacryloyloxyethyltrimethylammonium chloride, 3-(methacrylamido) propyltrimethylammonium chloride, and the like including mixtures thereof. Illustrative anionic monomers include p-styrene sulfonic acids, vinyl sulfonic acid, 2-acrylamido-2-methylpropane sulfonic acid, and the like including mixtures thereof. Illustrative amphoteric or zwitterionic monomers include 3-(2-acrylamido-2-methylpropyidimethylammonio)-1-propanesulfonate, co-N,N-dimethyl-N-methacroylamidoproplyammoniopropanesulfonate, N-vinylpyrrolidone-co-2-vinylpyridiniopropanesulfonate, and the like including mixtures thereof. These one or more monomers can be present in an amount from about 0.1 to about 15 parts by weight per 100 parts by weight of the unsaturated acid monomers and the hydrophobic monomers.

An important component of the composition of the invention is the use of a hydrophobic chain transfer agent, which serves to attach hydrophobic groups on the ends of the crosslinked copolymer and act as pseudo non-polar crosslinks. Typical of such hydrophobic chain transfer agents are, for example, long chain alkyl mercaptans and thioesters having from about 4 to about 30 carbon atoms, and preferably from about 8 carbon atoms to about 30 carbon atoms. Typical monomers useful as chain transfer agents include, for example, long chain alkyl mercaptans and thioesters such as n-dodecyl mercaptan, t-dodecyl mercaptan, octyl decyl mercaptan, tetradecyl mercaptan, hexadecyl mercaptan, butyl thioglycolate, isoctyl thioglycolate and dodecyl thioglycolate; and thiols such as butane thiol, decanethiol, dodecanethiol, 1-hexadecane thiol, nonanethiol, octadecanethiol, tetradecanethiol, tridecane thiol, undecane thiol, 2,4-dimethylbenzene thiol, 2,5-dimethylbenzene thiol, perfluorodecanethiol, 1-napthalenethiol, 2,4-di-t-butyl thiophenol. Additionally, amino-carboxylic acid-mercaptan containing compounds, generally referred to as amino acids, or peptide fragments containing from 2 to 15 amino acids where at least one amino acid is cysteine or homocysteine, such as HS-glutathione. The preferred chain transfer agents for use in the invention are octadecyl mercaptan or dodecyl mercaptan.

The hydrophobic chain transfer agent can be present in an amount from about 0.05 to about 5, desirably from about 0.1 to about 3, and preferably from about 0.2 to about 1.5 parts by weight based upon 100 total parts by weight of the unsaturated acid and hydrophobic comonomers.

The copolymer of the present invention desirably is crosslinked by a crosslinking monomer. Various polyunsaturated monomers are utilized to generate either a partially or substantially-crosslinked three-dimensional network. Crosslinking monomers include, for example, allyl ethers of sucrose or of pentaerythritol, or similar compounds, diallyl esters, dimethallyl ethers, allyl or methallyl acrylates and acrylamides, tetraallyl tin, tetravinyl silane, polyalkenyl methanes, diacrylates and dimethacrylates, divinyl compounds such as divinyl benzene, divinyl glycol, polyallyl phosphate, diallyloxy compounds, phosphite esters, and the like. Typical of such polyunsaturated monomers are di, tri, or tetra, penta, or hexa-allyl sucrose; di, tri, or tetra-allyl pentaerythritol; diallylphthalate, diallyl itaconate, diallyl fumarate, diallylmaleate, divinylbenzene, allylmethacrylate, allyl citrate, ethylene glycol di(meth)acrylate, trimethylolpropane triacrylate, 1,6-hexanediol diacrylate, pentaerythritol triacrylate, tetramethylene diethacrylate, tetramethylene dicarylate, ethylene diacrylate, ethylene dimethacrylate, triethylene glycol methacrylate, methylene bisacrylamide, and the like. Castor oils or polyols, esterfied with ethylenically unsaturated carboxylic acid and the like can also be used. Preferred crosslinking agents include allyl pentaerythritol, allyl sucrose, trimethylolpropane allyl ether, and divinyl glycol.

The cross-linking monomer can be used in an amount from about 0.005 to about 10 parts by weight, desirably from about 0.01 to about 5.0 parts by weight, and preferably from about 0.05 to about 2.5 parts by weight based upon 100 parts by weight of all of the unsaturated acid and the hydrophobic monomers forming the copolymer.

A steric stabilizer may optionally be included in the copolymer composition in order to increase the solids content of the polymer slurry. Various steric stabilizers can be utilized, including triblock copolymers of stearyl esters. The steric stabilizers have a hydrophilic group and a hydrophobic group and are generally block copolymers comprising a soluble block and an anchor block having a molecular weight (i.e., chain length) usually well above 1000, but a hydrophobe length of more than 50 Angstroms. When the steric stabilizer is a linear block copolymer, it is defined by the formula ABA where A is a hydrophilic moiety having a molecular weight of from about 300 to about 60,000 and a solubility of less than 1% in water at 25° C. Where the steric stabilizer is a random copolymeric comb steric stabilizer, it is defined by the formula $R_1Z_mQ_nR_2$ where R and R are terminating groups an may be the same or different and will be different from Z and Q, Z is a hydrophobic moiety having a solubility of less than 1% in water at 25° C., Q is a hydrophilic moiety having a solubility of more than 1% in water at 25° C., and m and n are integers of 1 or more, and are selected such that the molecular weight of the polymer is from about 100 to about 250,000. Such steric stabilizers are described in U.S. Pat. Nos. 5,373,044 and 5,349,030, and are hereby incorporated by reference.

Preferred steric stabilizers of the present invention include dimethicone copolyols, dimethicone copolyol esters, and dimethicone copolyol phthalate, all distributed by B. F. Goodrich. Examples of commercial compounds include Hypermer B-246 manufactured by ICI Surfactants and Pecosil® distributed by Phoenix Chemical.

When the optional steric stabilizer is present, the polymeric mixture will usually contain from about 0.1 to about 10 parts by weight per 100 parts by weight of the unsaturated acid and the hydrophobic monomers forming the copolymer.

The polymers of the present invention are preferably made by dispersion or precipitation polymerization. Such polymerization processes are well-known in the art and have been previously described as in U.S. Pat. Nos. 2,798,053; 3,915,921; 3,940,351; 4,062,817; 4,066,583; 4,267,103; 5,349,030; and 5,373,044; which are fully incorporated herein by reference.

Polymerization of the monomers is usually carried out in the presence of a free radical catalyst in a closed vessel in an inert atmosphere such as nitrogen, carbon dioxide, or argon under autogenous or artificially-induced pressure or optionally under reflux at atmospheric pressure. The temperature of the polymerization can vary from about 20° C. to about 135° C., desirably from about 25° C. to about 120° C. and preferably from about 25° C. to 100° C.

The polymerizations may be either batch, semi-batch or continuous. The agitation may be any agitation sufficient to maintain the slurry and obtain effective heat transfer including, for example, helical agitation, pitched turbines, and the like. Normal polymerization time is from about 1 to about 16 hours.

Typical free-radical forming catalysts include persulfates such as sodium, potassium or ammonium persulfates, per-oxygen compounds such as caprylyl peroxide, benzoyl peroxide, hydrogen peroxide, pelargonyl peroxide, cumene hydroperoxides, diisopropyl peroxydicarbonate, tertiary butyl diperphthalate, tertiary butyl perbenzoate, sodium peracetate, di-(2-ethylhexyl) peroxy dicarbonate, and the like, as well as azo catalysts such as azobis(isobutyronitrile). Other catalysts utilizable are the so-called "redox" type of catalyst, the heavy metal activated catalyst systems, and living free radical polymerization catalysts, including the s,s'-bis-(α,α'- disubstituted-α"-acetic acid)-trithiocarbonate and generally described by the formula:

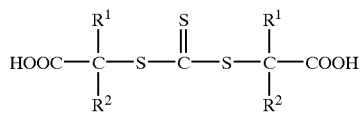

wherein $R^1$ and $R^2$, independently, can be the same or different, and can be linear or branched alkyls having from 1 to about 6 carbon atoms, or a $C_1$ to about $C_6$ alkyl having one or more substituents, or one or more aryls or a substituted aryl group having 1 to 6 substituents on the aryl ring, where the one or more substituents, independently, comprise an alkyl having from 1 to 6 carbon atoms; or an aryl; or a halogen such as fluorine or chlorine; or a cyano group; or an ether having a total of from 2 to about 20 carbon atoms such as methoxy, or hexanoxy; or a nitro; or combinations thereof. Examples of such compounds include s,s'-bis-2-methyl-2-propanoic acid-trithiocarbonate and s,s'-bis-(2-phenyl-2-propanoic acid)-trithiocarbonate. $R^1$ and $R^2$ can also form or be a part of a cyclic ring having from 5 to about 12 total carbon atoms. $R^1$ and $R^2$ are preferably, independently, methyl or phenyl groups. Some systems polymerize solely by heat, but catalysts generally provide better control. The monomers may be batch charged or continuously added during the course of polymerization or by any other manner of polymerization techniques conventionally used.

The polymerization reactions described herein are normally conducted in inert diluents such as organic fluids or mixtures of organic fluids, in which the monomers are preferably soluble but in which the polymer is substantially insoluble, so that the polymer product is preferably obtained as a fine friable or fluffy precipitate. Suitable solvents include liquid hydrocarbons such as hexane and heptane; cycloalkanes such as cyclohexane; aromatics such as benzene and alkyl-subsituted benzenes such as toluene and xylene; alkyl carboxylates such as ethyl acetate, isopropyl acetate, propyl acetate, methyl acetate or butyl acetate; haloalkanes and chlorofluoroalkanes such as methylene chloride, ethylene dichloride and 1,1,1-trichloroethane, and mixtures thereof; ketones; and mineral spirits with a flash point greater than abut 130° C., or mineral oil; and liquid or supercritical carbon dioxide and the like.

The amount by weight of polymerized solid product based upon the total weight of the solution will generally be from about 1 to about 50% and desirably from about 5 to about 50% and preferably from about 8 to about 40%.

Subsequent to the formation of the polymer composition, solvent is removed, as by filtration and/or evaporation, and the like.

The polymeric compositions described herein are most useful in an electrolyte-containing environment, including salt solutions and buffering systems. Various electrolytes can include sodium chloride, lithium chloride, potassium chloride, salts of magnesium, calcium, zinc, phosphorus, ammonium, sulfate, phosphate and carbonate. Such electrolyte solutions can be simple, or mixtures of dissolved ionic material may be present. Additionally, compounds with multiple charges and mixtures of charges may be used to make up the electrolyte solutions. Complex ions such as charged organic compounds (organic cations, organic anions), transition metal complexes such as metal oxides and charged organometallic compounds which dissolve to give ionic compounds, can be used to make up electrolyte solutions.

Where the electrolyte solution will be used under physiological conditions, ionic buffers and salt-containing solutions are generally useful. The pH and ionic make-up of such solutions are dependent upon the physiological location and condition under treatment.

A preferred electrolyte solution for the present invention can be a solution containing charged compounds, cations and anions, in a concentration generally from about 0.001 to about 5 weight %, and preferably from about 0.2 to about 3 weight %.

When the polymeric rheology modifier of the present invention is placed in an electrolytic solution, an unexpected increase in the viscosity of the solution is experienced. Such increase is generally from about 10, 25 or 50% up to about 400, 500 or 600%, or even 1000%. An increase in viscosity from about 100, 150 or 200% up to about 300 or 350% is preferred.

The polymeric compositions described herein are useful in a variety of systems, applications, with various compounds, and the like.

For example, the polymeric rheology modifier can be used in aqueous systems, including aqueous organic alcohols and emulsions, such as textile coatings (woven and non-woven), latex paint formulations, cosmetic formulations, pigment dispersions and slurries, dentrifices, hand lotions, liquid detergents, quenchants, agricultural chemicals, concrete additives, transmission fluids, waste water treatment, turbulent drag reduction, aircraft anti-icing, automative coatings, architectural coatings, industrial coatings, and the like.

The polymeric compositions of the present invention may have application in personal care applications, home care applications, and pharmaceutical applications.

Examples of various personal care applications include products such as the following: shampoos, for example 2-in-1 shampoos; baby shampoos; conditioning shampoos; bodifying shampoos; temporary hair color shampoos; 3-in-1 shampoos; anti-dandruff shampoos; hair color maintenance shampoos; acid (neutralizing) shampoos; salicylic acid shampoos;

Skin and body cleansers, for example moisturizing washes; antibacterial body washes; bath gels; shower gels; hand soaps; bar soaps; body scrubs; bubble baths; facial scrubs; foot scrubs;

Creams and lotions, for example alpha-hydroxy acid lotions and creams; beta-hydroxy acid creams and lotions; sin whiteners; self tanning lotions; sunscreen lotions; barrier lotions; moisturizers; hair styling creams; Vitamin C creams; liquid talc products and antibacterial lotions; and other moisturizing lotions and creams; and lotion treatments in non-woven substrates.

Skin and hair gels, for example facial masks, body masks, hydroalcoholic gels; hair gels; body gels; sunscreen gels; and the like, as well as other personal care applications such as permanent hair color, and the like.

Examples of home care applications include products such as: home care and industrial and institutional products, such as laundry detergents; dishwashing detergents (automatic and manual); hard surface cleaners; disinfecting treatments on non-woven substrates; hand soaps, cleaners and sanitizers; polishes (shoe, furniture, metal, etc.); automotive waxes, polishes, protectants, and cleaners, and the like.

Examples of pharmaceutical applications include topical formulations in the form of creams, lotions, ointments, or gels, where the polymeric rheology modifier may be used as a wetting aid for the pharmaceutically active material, or as a skin penetration enhancer, or as an emulsifier for a solvent phase having an aesthetic effect, or present to enhance the solubility or bioavailability of the pharmaceutically active material, or as a bioadhesive agent for mucus membranes including ophthalmic, nasal, buccal, vaginal, gastrointestinal, urologic, esophageal, gastric, intestinal, and rectal. Similar formulations for internal application within the living body, or oral administration, or administration by mechanical means, can be utilized.

These formulations could be administered or applied to either human or veterinary conditions for the full breadth of indications treatable by pharmaceutical means, such as fever, irritation, dermatitis, rash; viral, fungal, or bacterial infection; organic disease; etc.

The pharmaceutical applications could have any appropriate function for treatment of the condition, and can be a mixture of one or more pharmaceutically active materials, such as emetics, antiemetics, febrifuge, fungicide, biocide, bactericide, antibiotic, antipyretic, NSAID, emollient, analgesics, antineoplastics, cardiovascular agents, CNS stimulants, CNS depressants, enzymes, proteins, hormones, steroids, antipruritics, antirheumatic agents, biologicals, cough and cold treatments, dandruff products, gastrointestinal treatment agents, muscle relaxants, psychotherapeutic agents, skin and mucous membrane agents, skin care products, vaginal preparations, wound care agents, and other appropriate classes of pharmaceutically active agents capable of appropriate administration via dosage form.

Additionally, the polymeric compositions may be utilized in conjunction with various compounds such as a biological ingredient, e.g., active, such as pharmaceutical, medicinal, nutritional, and the like.

Examples of biological ingredients include Tretinoin; Progesterone; Methyl Salicylate, Capsaicin; Lidocaine; Prilocaine; Methyl Nicotinate; Crotamiton; Avobenzone; Oxybenzone; Kaolin; Pectin, Sulfamethoxazole; Fentoin; Albendazole, Pilocarpine HCl; Phenylpropanolamine HCl; Fluocinonide; Formulated Actives in the 1998 Physicians Desk Reference® and the like.

Various classes of medicinals which can be utilized include the following androgenotherapy; anesthetic; anorectic; anti-allergy; anti-asthmatic; antibacterial; antibacterial keratolytic; antibiotics; anti-depressants; antidermatosis; anti-diarrhea; anti-emetics; antifungal; anti-inflammatory; anti-inflammatory, analgesic; anti-inflammatory, anti-pruritics; anti-inflammatory, vasoconstrictive; anti-malaria; anti-parasitic, anti-protozoal; antiseptic; antiviral; anti-vomiting; babies gum treatment; bronchitis; burns; conjunctiva, contraceptive agent; cornea therapy; cough; estrogen; eye moisturizer; gastro-intestinal treatment; glaucoma; hemorrhoids treatment; hair loss; heart disease; heart-rhythm disorder; hormones; impotency; laxative; progestogen; revulsive; skin moisturizer; slimming; spasmophilia; spermacide; tooth health; urology; vaccine adjuvant; vaginal moisturizer; vasodilative; vein therapy; viracide; wound treatment; and the like, and mixtures thereof.

Various other active medicinal ingredients which can be utilized include acetazolamide; aescin; aesculi hippocastan; allantoine; amfepramone; aminopropylon; amorolfine; androstanolone; arnica; bamethan sulfate; benproperinembonate; benzalkonium chloride; benzocaine; benzoyl peroxide; benzyl nicotinate; betamethasone; betaxolol chlohydrate; buphenine hydrochloride; caffeine; calendula; campher; cetylpyridinium chloride; chloroquin phosphate; clarithromycin; clemastinhydrogene fumarate; clindamycin-2-dihydrogene phosphate; clobetasol-propionate; clotrimazole; codeine phosphate; croconazole; crotamiton; dexamethasone acetate; dexpanthenol; diclofenac; diethylamine salicylate; diflucortolone; diflucortolone valerate; diflucortone, chlorquinaldol; difluoroprednate; dimethyl sulfoxide; dimeticone 350-silicium dioxide; dimetinden; dimetindenmaleat; disopyramide; domperidone; ergotoxine; estradiol; estriol; etofenamate; felbinac; flubendazole; flufenamic acid; fluocinolone; fluocinolone acetonide; fluocortolone; fusidic acid; gelacturoglycani; heparine; hydrocortisone; hydroxyehtyl salicylate; ibuprofen; idoxuridine; imidazole salicylate;indomethacin; isoprenaline sulfate; ketoprofen; levomenthol; lidocaine hydrochloride; lindane; menthol; mepyramine; mesalazine; methyl nicotinate; methyl salicylate; metronidazole; miconazole; minoxidil; naftifin; nalixidic acid; naproxen; niflumic acid; nifuratel; nifuratel nystatine; nifuroxazide; nitroglycerin; nonivamid; nystatinnifuratel; omoconazole nitrate; o-rutoside; oxatomide; oxerutin; oxyphenbutazone; pancreatine; pentosane polysulfate; phenolphthalein; phenylbutazone-piper azine; phenylephrine; pilocarpine; piroxicam; plant extracts; polidoncanol; polycarbophil; polysaccharide; potassium phosphate; prednisolone; prilocaine; primycin sulphate lidocaine; progesterone; proteins; racem campher; verapamil; viloxazine; vintamin B6; xylitol; xylometazolie; zincum hyaluronicum.

Other active medicinal compounds include rectacnyl tritinoin; retinal palmitate; salicylamide; salicylic acid; sobrerol; sodium alginate; sodium bicarbonate; sodi um fluoride; sodium pentosan polysulfate; sodium phosphate; terpine; theophylline; thromboplastin; thymol; tocopherol acetate; tolmetin; tretinoin; troxerutine.

Various pharmaceutical agents which can be utilized include Ascorbic Acid; Guaifenesin; Quinidine Gluconate; Aspirin; Isosorbide Dinitrate; Quinidine Sulfate; Atenolol; Isoniazid; Sodium Valproate; Caramiphen HCl; Lithium Carbonate; Sulfamethizole; Chlorpheniramine Maleate; Mepyramine Maleate; Theophylline; Dexchlorpheniramine; Methadone HCl; Thiamine; Diethyl Propion HCl; Metoclopramide; Tridecamine; Diphenhydramine; Nitrofurantoin; erapamil HCl; Ephedrine HCl; Phenylpropanolamine HCl; Viloxazine; Furosemide; Pseudoephedrine; 2-Ethylnexyl Salicylate; Clocortolone pivalate; Kaolin; Permethrin; Adapalene; Crotamiton; Lidocaine; Phenylbenzimidazole Sulfonic Acid; Albendazole; Desoximetasone; Menthol; Phenyl propanola mine; Avobenzone; Dimethicone; Mesalamine; Pilocarpine HCl; Benzalkonium Chloride; Methyl Nicotinate; Piperonyl Butoxide; Benzocaine; Erythromycin; Methyl Salicylate; Prilocaine; Benzoyl Peroxide; Ehtylhexyl p-Methoxycinnamate; Metronidazole; Progesterone; Betamethasone dipropionate; Fenytoin; Naftifine HCl; Pyrethrum Extract; Betaxolol HCl; Fluocinonide; Nalicixic acid; Rimexolone; Camphor; Guaifenesin; Nitrofurantoin monohydrate; Simethicone; Capsaicins; Homosalate; Octyl Methoxycinnamate; Sulfamethoxazole; Carithromycin; Hydrocortisone; Oxybenzone Tretinoin; Clindamycin phosphate; Hydrocortisone valeratei; Padimate; Zinc Chloride; Clobetasol propionate; Hydroquinone; Pectin; 2-Ethylhexyl Salicylate; Clocortolone pivalate; Kaolin; Permethrin; Adapalene; Crotamiton; Lidocaine; Phenylbenzimidazole Sulfonic Acid; Albendazole; Desoximetasone; Menthol; Phenylpropanolamine; Avobenzone; Dimethicone; and Mesalamine.

The following examples show ways in which the invention can be practiced, as well as showing comparative examples. However, the examples should not be construed as limiting the invention.

EXAMPLE OF PREPARATION OF THE COPOLYMER

In order to illustrate the present invention, a polymerization reaction was conducted in a water jacketed two liter Pyrex resin kettle equipped with mechanical stirrer, a thermometer and reflux condenser topped with a nitrogen inlet connected to a bubbler to provide a slightly positive pressure of nitrogen throughout the polymerization. The water jacket was connected to a constant temperature circulator. In producing a copolymer, the resin kettle was charged with solvent, polymerizable monomers, crosslinker and chain transfer agent. A steric stabilizing surface active agent may also be added. In accordance with the present invention, a varied amount of these monomers were added based upon the weight of the acrylic acid and co-acrylate ester monomers (i.e., phm or parts per hundred monomer). In all cases, the mixture was sparged with nitrogen for 30 minutes while the reactor was heated to the reaction temperature. Upon reaching the reaction temperature, the sparging tube was removed while a nitrogen purge was maintained, stirring was begun, and the recipe amount of di-(2-ethylhexyl)-peroxydicarbonate (in an amount of 0.275 g to 0.98 g) was added. Polymerization was evident in a matter of minutes as the solution became hazy with precipitated polymer. If polymerization did not start within 15 minutes, the mixture was resparged. After several hours the mixture became a thick slurry, and the polymerization continued for a total of 8 hours. The polymer slurry was then transferred to a single neck flask and the solvent was removed by a rotary evaporator at 95° C. to 105° C. at 27 inches vacuum. The resulting dry polymer product was a fine white powder. When dispersed in water, the polymer hydrates.

Thickening Viscosity

A 1% stock dispersion of the dry powder (8 g/792 g water) was prepared in demineralized water using a Lightnin' mixer at 1,000 with a 3-blade marine impeller. The resin was introduced through a 20 mesh screen with stirring and the dispersion was mixed for a total of one hour.

The viscosity of the dispersion was the n measured using a Brookfield RVT-DV Viscometer at 20 rpm. The viscosity of the dispersion is referred to as the Dispersion Viscosity or Un-neutralized Viscosity.

The dispersion was then neutralized to pH 7.3–7.8 with 18% NaOH using an S-paddle at 300 rpm for 3–5 minutes, after which the mucilages were allowed to stand at room temperature for at least 30 minutes.

The sample was then measured for Brookfield viscosity using a Brookfield RVT-DV Viscometer at 20 rpm. The viscosity of the neutralized dispersion is referred to as the Neutralized Viscosity.

Salt Sensitivity

Sodium chloride was then added to the sample in solid form with stirring using an S-paddle at 300 rpm for 3–5 minutes. Salt additions of 2.0 g were made with the Brookfield viscosities being read between additions.

Examples 1–4

A number of polymers were produced in accordance with the copolymer preparation example and tests were conducted to characterize the polymers. The results are reported in Table I.

| Smp # | AA | T-BA (phm) | SMA (phm) | X Link | phm | Chain Trans | phm | Solvt | Temp | TS | BV 0.5 wt % | BV at 0.5 1 wt % NaCL | BV at 1.0% | BV 1.0 wt % NaCl | 1.0 wt % Dispersion Viscosity |
|---|---|---|---|---|---|---|---|---|---|---|---|---|---|---|---|
| 1 | 95 |  | 5 | APE | 0.25 | ODSH | 0.8 | CO | 55 | 11 | 50 | 1,220 | 162 | 8,300 | 29 |
| 2 | 85 | 10 | 5 | TMPDAE | 0.25 | ODSH | 0.3 | CO | 55 | 11 | 62 | 2,030 | 190 | 12,300 | 44 |
| 3 | 95 |  | 5 | APE | 0.3 | ODSH | 0.25 | CO | 55 | 11 | 88 | 2,500 | 900 | 15,500 | — |
| 4 | 95 |  | 5 | APE | 0.25 | ddSH | 0.2 | CO | 55 | 11 | 178 | 1630 | 840 | 10,100 | 488 |

Table Notations and Abbreviations:
AA = Acrylic Acid
T-BA = t-butylacrylamide
SMA = steryl methacrylate
APE = allyl pentaerythritol
TMPDAE = trimethoxypropylallyl ether
ODSH = octadecyl mercaptan
CO = cyclohexane/ethyl acetate azeotrope
ddSH = dodecyl mercaptan These results clearly show a combination of polymers that have very low initial viscosity, very low viscosity upon neutralization and an increase in viscosity upon introduction of salt.

Examples 5–9

Polymer samples 5–9 were produced in accordance with the typical copolymerization process example and tests were conducted to characterize those polymers. These reactions show a combination of polymers that have lower viscosity upon neutralization and an increase in viscosity upon introduction of salt.

|       |    |     |     |      |      | Chain  |     |       |      |    | BV 0.5 | BV at 0.5   | BV at | BV 1.0 wt% |
|-------|----|-----|-----|------|------|--------|-----|-------|------|----|--------|-------------|-------|------------|
| Smp # | AA | T-BA| SMA | X link| phm | Trans  | phm | Solvt | Temp | TS | wt %   | 1 wt % NaCL | 1.0%  | NaCl       |
| 5     | 95 |     | 5   | APE  | 0.25 | ODSH   | 0.3 | CO    | 55   | 11 | 610    | 2,910       | 5,250 | 16,300     |
| 6     | 95 |     | 5   | APE  | 0.25 | ODSH   | 0.2 | CO    | 55   | 11 | 640    | 1,960       | 3,430 | 13,900     |
| 7     | 85 | 10  | 5   | TMPDAE| 0.3 | ODSH   | 0.2 | CO    | 45   | 11 | 1050   | 4500        | 6,400 | 24,500     |
| 8     | 95 |     | 5   | APE  | 0.25 | *Glutathiol | 0.27 | CO | 55 | 11 | 1340  | 2210        | 7650  | 14,200     |
| 9     | 95 |     | 5   | APE  | 0.25 | Glutathiol | 0.8 | CO   | 55   | 11 | 3030   | 1490        | 6100  | 10,800     |

*HS-glutathione

Example 10–11

Polymer samples 10–11 were produced in accordance with the typical copolymerization process example in the presence of a steric stabilizer Hypermer B-246) and tests were conducted to characterize those polymers. These reactions show a combination of polymers that have lower viscosity upon neutralization and an increase in viscosity upon introduction of salt.

|       |    |     |     |       |     | Chain |     | STERIC Stab |         |      |    | BV 0.5 | BV at 0.5   | BV at | BV 1.1 wt % |
|-------|----|-----|-----|-------|-----|-------|-----|-------------|---------|------|----|--------|-------------|-------|-------------|
| Smp # | AA | T-BA| SMA | X link| phm | Trans | phm | phm         | Solvent | Temp | TS | wt %   | 1 wt % NaCL | 1.0%  | NaCl        |
| 10    | 85 | 10  | 5   | TMPDAE| 0.3 | ODSH  | 0.2 | 1.5         | CO      | 55   | 17 | 870    | 3580        | 5750  | 19,100      |
| 11    | 85 | 10  | 5   | TMPDAE| 0.3 | ODSH  | 0.2 | 3           | CO      | 45   | 17 | 1150   | 3980        | 4400  | 19,400      |

Comparative Examples 1–2

Comparative polymer samples 1–2 were produced in accordance with the typical copolymerization process except that no hydrophobic monomers were incorporated into the polymerization and tests were conducted to characterize those polymers. These reactions show that the hydrophobic monomer or combination of hydrophobic monomers is essential to produce polymers that have lower viscosity upon neutralization and an increase in viscosity upon introduction of salt.

|       |     |     |     |       |      | Chain |      |         |      |    | BV 0.5 | BV at 0.5   | BV at  | BV 1 1     |
|-------|-----|-----|-----|-------|------|-------|------|---------|------|----|--------|-------------|--------|------------|
| Exp # | AA  | T-BA| SMA | X link| phm  | Trans | phm  | Solvent | Temp | TS | wt %   | 1 wt % NaCL | 1.0 wt%| wt % NaCl  |
| 1     | 100 | 0   | 0   | APE   | 0.25 | ODSH  | 0.5  | CO      | 55   | 11 | 72     | 22          | 120    | 36         |
| 2     | 100 | 0   | 0   | APE   | 0.25 | ODSH  | 0.75 | CO      | 55   | 11 | 34     | 12          | 44     | 17         |

Comparative Examples 3–6

Comparative polymer samples 3–6 were produced in accordance with the typical copolymerization process except that a hydrophilic chain transfer agent were incorporated into the polymerization and tests were conducted to characterize those polymers. These reactions show that the hydrophobic chain transfer agent is essential to produce polymers that have lower viscosity upon neutralization and an increase in viscosity upon introduction of salt.

| Example # | AA | SMA | X link | phm | Chain Trans | phm | Solvent | Temp | TS | BV 0.5 wt % | BV at 0.5 1 wt % NaCL | BV at 1.0 wt % | BV 1 1 wt % NaCl |
|---|---|---|---|---|---|---|---|---|---|---|---|---|---|
| 3 | 95 | 5 | APE | 0.25 | *NAC | 0.5 | **EtAc | 11 | 55 | 17 | 10 | 28 | 27 |
| 4 | 95 | 5 | APE | 0.25 | NAC | 0.75 | EtAc | 11 | 55 | 12 | — | 17 | — |
| 5 | 95 | 5 | APE | 0.25 | NAC | 0.75 | CO | 11 | 55 | 8 | — | 11 | — |
| 6 | 100 | | APE | 0.27 | | | EtAc | 11 | 55 | 15,400 | 306 | 22,300 | 4,600 |

*N-acetyl cysteine
**Ethyl Acetate

Emulsion Stabilization and Thickening in the Presence of Electrolyte

A two phase emulsion was prepared. The polymer of Example 1 (0.40 wt %) was dispersed in mineral oil (20 wt %). The mineral oil suspension was dispersed in water and neutralized with NaOH to a ph of 6.5. The Brookfield viscosity of the emulsion was measured and found to be 210 centipoise (cP). An addition of 1 wt % NaCl was made to the emulsion and the viscosity was measured and found to be 4040 cP. The sample was then placed in a 45° C. oven for two weeks. The stability and viscosity of the emulsion were then checked. Minimal separation of the creamy white emulsion occurred, and the viscosity did not change from 4040 cP.

Enhanced Thickening Viscosity in the Presence of Surfactant

A gelled formulation was prepared with a surfactant. The polymer of Example 1 (1.5 wt %) was dispersed in water and stirred for 30 minutes. Propylene glycol (10 wt %) and IGEPAL-CA 630 (1.5 wt %) was added to the solution and mixed well. The solution was pH adjusted to 4.35 with NaOH. The mixture gelled immediately and the Brookfield Viscosity was measured at 20 rpm. The viscosity measured 64,500 cP.

While in accordance with the Patent Statutes the best mode and preferred embodiment have been set forth, the scope of the invention is not limited thereto but rather by the scope of the claims.

What is claimed is:

1. A rheology modifying copolymer composition prepared by dispersion or precipitation polymerization for increasing viscosity in an electrolyte-containing environment comprising:

said copolymer composition derived from at least one unsaturated carboxylic acid monomer;

at least one hydrophobic monomer;

a hydrophobic chain transfer agent comprising alkyl mercaptans, thioesters, amino acid-mercaptan-containing compounds or peptide fragments, or combinations thereof;

a cross-linking agent; and, optionally, a steric stabilizer;

wherein the amount of said unsaturated carboxylic acid monomer is from about 60% to about 98% by weight based upon the total weight of said unsaturated monomers and a hydrophobic monomer.

2. A copolymer composition according to claim 1, wherein said unsaturated carboxylic acid monomer has from about 3 to about 12 carbon atoms.

3. A copolymer composition accordingly to claim 2, wherein said hydrophobic monomer has the formula:

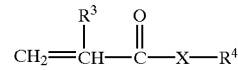

wherein $R^3$ is H or methyl;

$R^4$ is alkyl, amide, alkoxy or cyano derivative;

X is O or NH;

and mixtures thereof.

4. A copolymer composition according to claim 3, wherein said cross-linking agent is an allyl ether of sucrose or pentaerythritol, diallyl esters, dimethallyl ethers, allyl or methallyl acrylates and acyrlamides, tetrallyl tin, tetravinyl silane, polyalkenyl methanes, diacrylates and dimethacrylates, divinyl compounds, divinyl glycol, polyallyl phosphate, trimethoxypropylallyl ether, diallyloxy compounds, phosphite esters, and combinations thereof.

5. A copolymer composition according to claim 4, wherein said unsaturated carboxylic acid monomer is acrylic acid or methacrylic acid.

6. A copolymer composition according to claim 5, wherein said hydrophobic monomer is octadecyl methacrylate, hexadecyl methacrylate, behenyl methacrylate, steryl methacrylate, or combinations thereof.

7. A copolymer composition according to claim 6, wherein said cross-linking agent is an allyl ether of sucrose, an allyl ether of pentaerythritol, trimethylolpropane allyl ether, trimethoxypropylallyl ether, or divinyl glycol, or combinations thereof, and wherein said cross-linking agent is present in an amount from about 0.01 to about 5 parts by weight per 100 parts by weight of said unsaturated acid monomer and said hydrophobic monomer.

8. A copolymer composition according to claim 7, wherein said hydrophobic chain transfer agent is n-dodecyl mercaptan, t-dodecyl mercaptan, octyl decyl mercaptan, tetradecyl mercaptan, hexadecyl mercaptan, butyl thioglycolate, isooctyl thiglycolate, dodecyl thioglycolate, butane thiol decanethiol, tridecane thiol, undecane thiol, 2,4-dimethylbenzene thiol, 2,5-dimethylbenzene thiol, perfluorodecanethiol, 1-napthalenethiol, 2,4-di-t-butyl thiophenol, or amino carboxylic acid-mercaptan containing compounds or peptide fragments containing from 2 to 15 amino acids where at least one amino acid is cysteine or homocysteine, and wherein said chain transfer agent has from about 4 to about 30 carbon atoms, and wherein the amount of said hydrophobic chain transfer agent is from about 0.05 to about 5 parts by weight per 100 parts by weight of said unsaturated acid monomers and said hydrophobic monomer.

9. The copolymer composition of claim 8, wherein said chain transfer agent is octadecyl mercaptan or dodecyl mercaptan and wherein said chain transfer agent is present in an amount from about 0.1 to about 3 parts by weight based upon 100 total parts by weight of said unsaturated acid monomers and said hydrophobic monomers.

10. A copolymer composition according to claim 4 including said steric stablizier, wherein said steric stabilizer is a dimethicone copolyol, a dimethicone copolyol ester, or a dimethicone copolyol phthalate and said steric stabilizer is present in an amount from about 0.1 to about 10 parts by weight per 100 parts by weight of said unsaturated acid monomers and said hydrophobic monomers.

11. A copolymer composition according to claim 1, further comprising at least one nonionic, cationic, anionic, amphoteric, or zwitterionic monomers, or combinations thereof.

12. A copolymer composition according to claim 8, further comprising at least one nonionic, cationic, anionic, amphoteric, or zwitterionic monomer, or combinations thereof, in an amount of from about 0.1 to about 10 parts by weight per 100 parts by weight of said unsaturated acid monomers and said hydrophobic monomers.

13. The copolymer composition according to claim 1, wherein said hydrophobic monomer is a complex hydrophobe having the formula:

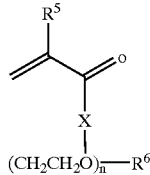

wherein $R^5$ is H or methyl;

X is O or NH;

$R^6$ is $C_8$–$C_{24}$ alkyl, or alkylaryl, or the residue of a polycylic hydrocarbyl; and n=1 to 750.

14. A process for making the copolymer composition of claim 1, comprising precipitation or dispersion copolymerizing the monomeric mixture in the presence of a free-radical producing catalyst at a temperature between about 20° C. to about 135° C.

15. An aqueous composition comprising an electroyte-containing solution and an effective amount of an aqueous copolymer composition according to claim 1 to thicken said composition.

16. A personal care product containing the copolymer composition of claim 1.

17. A home-care product containing the copolymer composition of claim 1.

18. An industrial application product containing the copolymer composition of claim 1.

19. An agricultural application product containing the copolymer composition of claim 1.

20. A therapeutic-containing composition adapted for use as a drug delivery system comprising:

said copolymer composition prepared by dispersion or precipitation polymerization and derived from at least one unsaturated carboxylic acid monomer;

at least one hydrophobic monomer;

a hydrophobic chain transfer agent comprising alkyl mercaptans, thioesters, amino acid-mercaptan-containing compounds or peptide fragments, or combinations thereof;

a cross-linking agent; and, optionally, a steric stabilizer; and an active ingredient;

wherein the amount of said unsaturated carboxylic acid monomer is from about 60% to about 98% by weight based upon the total weight of said unsaturated monomers and a hydrophobic monomer.

21. A therapeutic-containing composition according to claim 20, wherein said unsaturated carboxylic acid monomer has from about 3 to about 12 carbon atoms.

22. A therapeutic-containing composition accordingly to claim 21, wherein said hydrophobic monomer has the formula:

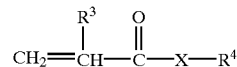

wherein $R^3$ is H or methyl;

$R^4$ is alkyl, amide, alkoxy or cyano derivative;

X is O or NH;

and mixtures thereof.

23. A therapeutic-containing composition according to claim 22, wherein said cross-linking agent is an allyl ether of sucrose or pentaerythritol, diallyl esters, dimethallyl ethers, allyl or methallyl acrylates and acyrlamides, tetrallyl tin, tetravinyl silane, polyalkenyl methanes, diacrylates and dimethacrylates, divinyl compounds, divinyl glycol, polyallyl phosphate, trimethoxypropylallyl ether, diallyloxy compounds, or phosphite esters, or combinations thereof.

24. A therapeutic-containing composition according to claim 23, wherein said unsaturated carboxylic acid monomer is acrylic acid or methacrylic acid.

25. A therapeutic-containing composition according to claim 24, wherein said hydrophobic monomer is octadecyl methacrylate, hexadecyl methacrylate, behenyl methacrylate, steryl methacrylate, or combinations thereof.

26. A therapeutic-containing composition according to claim 25, wherein said cross-linking agent is an allyl ether of sucrose, an allyl ether of pentaerythritol, trimethylolpropane allyl ether, trimethoxypropylallyl ether or divinyl glycol, or combinations thereof, and wherein said cross-linking agent is present in an amount from about 0.01 to about 5 parts by weight per 100 parts by weight of said unsaturated acid monomer and said hydrophobic monomer.

27. A therapeutic-containing composition according to claim 26, wherein said hydrophobic chain transfer agent is n-dodecyl mercaptan, t-dodecyl mercaptan, octyl decyl mercaptan, tetradecyl mercaptan, hexadecyl mercaptan, butyl thioglycolate, isooctyl thiglycolate, dodecyl thioglycolate, butane thiol decanethiol, tridecane thiol, undecane thiol, 2,4-dimethylbenzene thiol, 2,5-dimethylbenzene thiol, perfluorodecanethiol, 1-napthalenethiol, or 2,4-d-t-butyl thiophenol, and wherein the amount of said hydrophobic chain transfer agent is from about 0.05 to about 5 parts by weight per 100 parts by weight of said unsaturated acid monomer and said hydrophobic monomer.

28. The therapeutic-containing composition of claim 27, wherein said chain transfer agent is octadecyl mercaptan or dodecyl mercaptan and wherein said chain transfer agent is present in an amount from about 0.1 to about 3 parts by weight based upon 100 total parts by weight of said unsaturated acid monomers and said hydrophobic monomers.

29. A therapeutic-containing composition according to claim 23, including a steric stabilizer, wherein said steric stabilizer is a dimethicone copolyol, a dimethicoe copolyol ester or a dimethicone copolyol phthalate and said steric stabilizer is present in an amount form about 0.1 to about 10 parts by weight per 100 parts by weight of said unsaturated acid monomers and said hydrophobic monomers.

30. A therapeutic-containing composition according to claim 20 further comprising at least one nonionic, cationic, anionic, amphoteric, or zwitterionic monomers or combinations thereof.

31. A therapeutic-containing composition according to claim 27, further comprising at least one nonionic, cationic, anionic, amphoteric, or zwifterionic monomer, or combinations thereof, in an amount of from about 0.1 to about 10 parts by weight per 100 parts by weight of said unsaturated acid monomers and said hydrophobic monomers.

32. The therapeutic-containing composition according to claim 20, wherein said hydrophobic monomer is a complex hydrophobe having the formula:

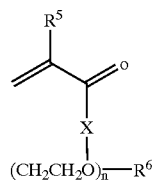

wherein
 $R^5$ is H or methyl;
 X is O or NH;
 $R^6$ is $C_8$–$C_{30}$ alkyl, alkylaryl, or the residue of a polycyclic hydrocarbyl; and
 n=1 to 30.

33. An electrolyte composition containing a copolymer composition prepared by dispersion or precipitation polymerization comprising: at least one unsaturated carboxylic acid monomer, at least one hydrophobic monomer, a hydrophobic chain transfer agent comprising alkyl mercaptans, thioesters, amino acid-mercaptan-containing compounds or peptide fragments, or combinations thereof, a cross-linking agent, and, optionally, a steric stabilizer, wherein said unsaturated carboxylic acid monomer is present in an amount from about 60% to about 98% by weight based upon the total weight of said unsaturated monomers and a hydrophobic monomer, said electrolyte composition having an increased viscosity as compared with an electrolyte composition without said copolymer composition.

34. An electrolyte composition according to claim 33, wherein said unsaturated carboxylic acid monomer has from about 3 to about 12 carbon atoms.

35. An electrolyte composition accordingly to claim 34, wherein said hydrophobic monomer has the formula:

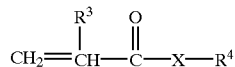

wherein
 $R^3$ is H or methyl;
 $R^4$ is alkyl, amide, alkoxy or cyano derivative;
 X is O or NH;
 and mixtures thereof.

36. An electrolyte composition according to claim 35, wherein said cross-linking agent is an allyl ether of sucrose or pentaerythritol, diallyl esters, dimethallyl ethers, allyl or methallyl acrylates and acyrlamides, tetrallyl tin, tetravinyl silane, polyalkenyl methanes, diacrylates and dimethacrylates, divinyl compounds, divinyl glycol, polyallyl phosphate, trimethoxypropylallyl ether, diallyloxy compounds, or phosphite esters, or combinations thereof.

37. An electrolyte composition according to claim 36, wherein said unsaturated carboxylic acid monomer is acrylic acid or methacrylic acid.

38. An electrolyte composition according to claim 37, wherein said hydrophobic monomer is octadecyl methacrylate, hexadecyl methacrylate, behenyl methacrylate, steryl methacrylate or combinations thereof.

39. An electrolyte composition according to claim 38, wherein said cross-linking agent is an allyl ether of sucrose, an allyl ether of pentaerythritol, trimethylolpropane allyl ether, or divinyl glycol, or combinations thereof, and wherein said cross-linking agent is present in an amount from about 0.01 to about 5 parts by weight per 100 parts by weight of said unsaturated acid monomer and said hydrophobic monomer.

40. An electrolyte composition according to claim 39, wherein said hydrophobic chain transfer agent is n-dodecyl mercaptan, t-dodecyl mercaptan, octyl decyl mercaptan, tetradecyl mercaptan, hexadecyl mercaptan, butyl thioglycolate, isooctyl thiglycolate, dodecyl thioglycolate, dodecyl thioglycolate, butane thiol decanethiol, tridecane thiol, undecane thiol, 2,4-dimethylbenzene thiol, 2,5-dimethylbenzene thiol, perfluorodecanethiol, 1-napthalenethiol, 2,4-di-t-butyl thiophenol, or amino carboxylic acid-mercaptan containing compounds or peptide fragments containing from 2 to 15 amino acids where at least one amino acid is cysteine or homocysteine, and wherein said chain transfer agent has from about 4 to about 30 carbon atoms, and wherein the amount of said hydrophobic chain transfer agent is from about 0.05 to about 5 parts by weight per 100 parts by weight of said unsaturated acid monomers and said hydrophobic monomer.

41. An electrolyte composition of claim 40, wherein said chain transfer agent is octadecyl mercaptan or dodecyl mercaptan and wherein said chain transfer agent is present in an amount from about 0.1 to about 3 parts by weight based upon 100 total parts by weight of said unsaturated acid monomers and said hydrophobic monomers.

42. An electrolyte composition according to claim 36, including said steric stabilizer, wherein said steric stabilizer is a dimethicone copolyol, a dimethicone copolyol ester, or a dimethicone copolyol phthalate and said steric stabilizer is present in an amount form about 0.1 to about 10 parts by weight per 100 parts by weight of said unsaturated acid monomers and said hydrophobic monomers.

43. An electrolyte composition according to claim 33, further comprising at least one nonionic, cationic, anionic, or amphoteric or zwifterionic monomers, or combinations thereof.

44. An electrolyte composition according to claim 40, further comprising at least one nonionic, cationic, anionic, amphoteric, or zwifterionic monomers, or combinations thereof, are present in an amount of from about 0.1 to about 10 parts by weight per 100 parts by weight of said unsaturated acid monomers and said hydrophobic monomers.

45. An electrolyte composition according to claim 33, wherein said hydrophobic monomer is a complex hydrophobe having the formula:

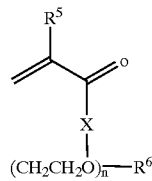

wherein
R⁵ is H or methyl;
X is O or NH;
R⁶ is $C_8$–$C_{24}$ alkyl, or alkylaryl, or the residue of a polycylic hydrocarbyl; and
n=1 to 750.

46. A process for preparing a copolymer composition having increased viscosity in a salt-containing environment comprising the steps of:
  a. forming a mixture comprising at least one unsaturated carboxylic acid monomer, at least one hydrophobic monomer, a hydrophobic chain transfer agent comprising alkyl mercaptans, thioesters, or amino acid-mercaptan-containing compounds or peptide fragments, or combinations thereof, a cross-linking agent, and optionally, a steric stabilizer, wherein the amount of said unsaturated carboxylic acid monomer is from about 60% to about 98% by weight based upon the total weight of said unsaturated monomers and a hydrophobic monomer; and
  b. polymerizing said mixture by dispersion or precipitation polymerization to form said copolymer.

47. A process according to claim 46, wherein said unsaturated carboxylic acid monomer has from about 3 to about 12 carbon atoms, and wherein the amount of said unsaturated carboxylic acid monomer is from about 60% to about 98% by weight based upon the total weight of said unsaturated monomers and said hydrophobic monomers.

48. A process according to claim 47, wherein said hydrophobic monomer has the formula:

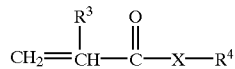

wherein
R³ is H or methyl;
R⁴ is alkyl, amide, alkoxy or cyano derivative;
X is O or NH;
and mixtures thereof.

49. A process according to claim 48, wherein said cross-linking agents is an allyl ether of sucrose or pentaerythritol, diallyl esters, dimethallyl ethers, allyl or methallyl acrylates and acyrlamides, tetrallyl tin, tetravinyl silane, polyalkenyl methanes, diacrylates and dimethacrylates, divinyl compounds, divinyl glycol, polyallyl phosphate, trimethoxypropylallyl ether, diallyloxy compounds, phosphite esters, or combinations thereof.

50. A process according to claim 49, wherein said unsaturated carboxylic acid monomer is acrylic acid or methacyrlic acid.

51. A process according to claim 50, wherein said hydrophobic monomer is octadecyl methacrylate, hexacecyl methacrylate, behenyl methacrylate, steryl methacrylate, or combinations thereof.

52. A process according to claim 51, wherein said cross-linking agent is an allyl ether of sucrose, an allyl ether of pentaerythritol, trimethylolpropane allyl ether, trimethoxypropylallyl ether, or divinyl glycol, or combinations thereof, and wherein said cross-linking agent is present in an amount from about 0.01 to about 5 parts by weight per 100 parts by weight of said unsaturated acid monomer and said hydrophobic monomer.

53. A copolymer composition according to claim 52, wherein said hydrophobic chain transfer agent is n-dodecyl mercaptan, t-dodecyl mercaptan, octyl decyl mercaptan, tetradecyl mercaptan, hexadecyl mercaptan, butyl thioglycolate, isooctyl thiglycolate, dodecyl thioglycolate, butane thiol decanethiol, tridecane thiol, undecane thiol, 2,4-dimethylbenzene thiol, 2,5-dimethylbenzene thiol, perfluorodecanethiol, 1-napthalenethiol, 2,4-di-t-butyl thiophenol, or amino carboxylic acid-mercaptan containing compounds or peptide fragments containing from 2 to 15 amino acids where at least one amino acid is cysteine or homocysteine, and wherein the amount of said hydrophobic chain transfer agent is from about 0.05 to about 5 parts by weight per 100 parts by weight of said unsaturated acid monomers and said hydrophobic monomer.

54. The process according to claim 53, wherein said hydrophobic chain transfer agent is octadecyl mercaptan or dodecyl mercaptan and wherein said chain transfer agent is present in an amount from about 0.1 to about 3 parts by weight based upon 100 parts by weight of said unsaturated acid monomers and said hydrophobic monomers.

55. A process according to claim 49, including said steric stabilizer, wherein said steric stabilizer is a diemthicone copolyol, a dimethicone copolyol ester, or a dimethicone copolyol phthalate and said steric stabilizer is present in an amount from about 0.1 to about 10 parts by weight per 100 parts be weight of said unsaturated acid monomers and said hydrophobic monomers.

56. A process according to claim 46 further comprising at least one nonionic, anionic, cationic, amphoteric or zwitterionic monomers, or combinations thereof.

57. A process according to claim 53 further comprising at least one nonionic, cationic, anionic, amphoteric, or zwitterionic monomer, or combinations thereof, in an amount of from about 0.1 to about 10 parts by weight per 100 parts by weight of said unsaturated acid monomers and said hydrophobic monomers.

58. A process according to claim 46, wherein said hydrophobic monomer is a complex hydrophobe having the formula:

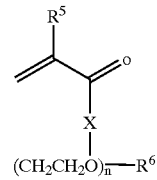

wherein
R⁵ is H or methyl;
X is O or NH;
R⁶ is $C_8$–$C_{24}$ alkyl, or alkylaryl, or the residue of a polycylic hydrocarbyl; and
n=1 to 750.

59. A copolymer composition comprising at least one unsaturated carboxylic acid monomer, at least one hydro phobic monomer, a hydrophobic chain transfer agent comprising alkyl mercaptans, thioesters, amino acid-mercaptan-containing compounds or peptide fragments, or combinations thereof, a cross-linking agent, and, optionally, a steric stabilizer, wherein said copolymer composition, in the presence of an electrolyte-containing solution, provides an increase in the viscosity of said electrolyte-containing solution from about 10% up to about 1000%.

60. A copolymer composition according to claim 59, wherein the viscosity of said electrolyte-containing solution is increased from about 100% up to about 350%.

61. A copolymer composition according to claim 7, wherein said hydrophobic chain transfer agent has from about 4 to about 30 carbon atoms.

* * * * *